Jan. 2, 1968   N. A. MURPHY ET AL   3,361,550
MANUFACTURE OF CELLULAR MATERIAL ON A MOLTEN METAL BATH
Filed Dec. 17, 1964   4 Sheets-Sheet 1
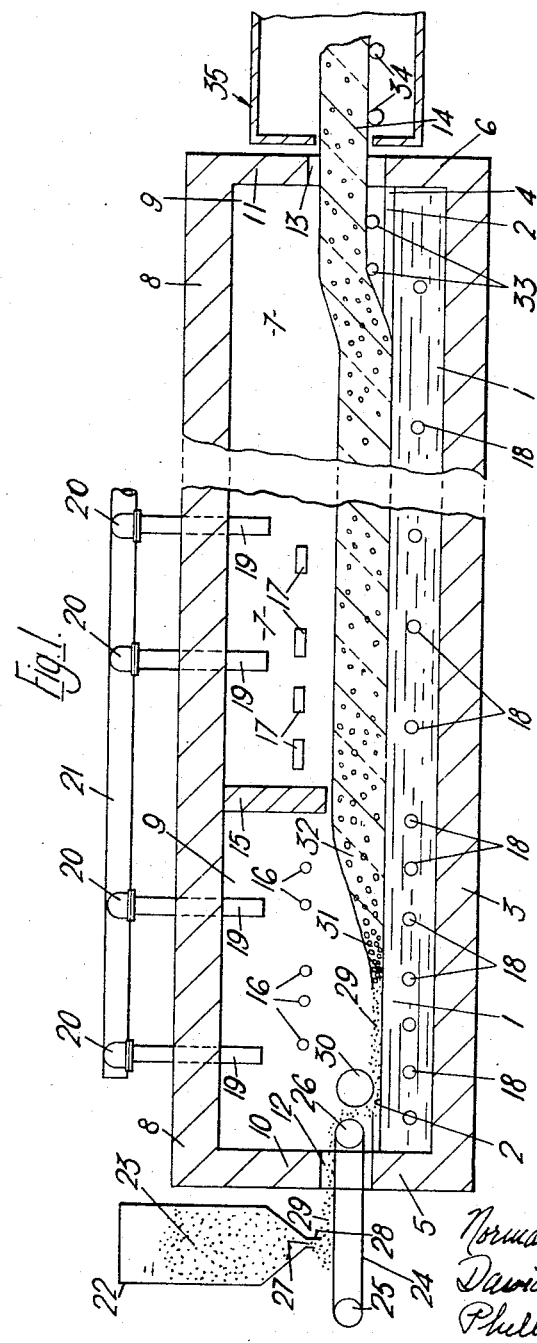

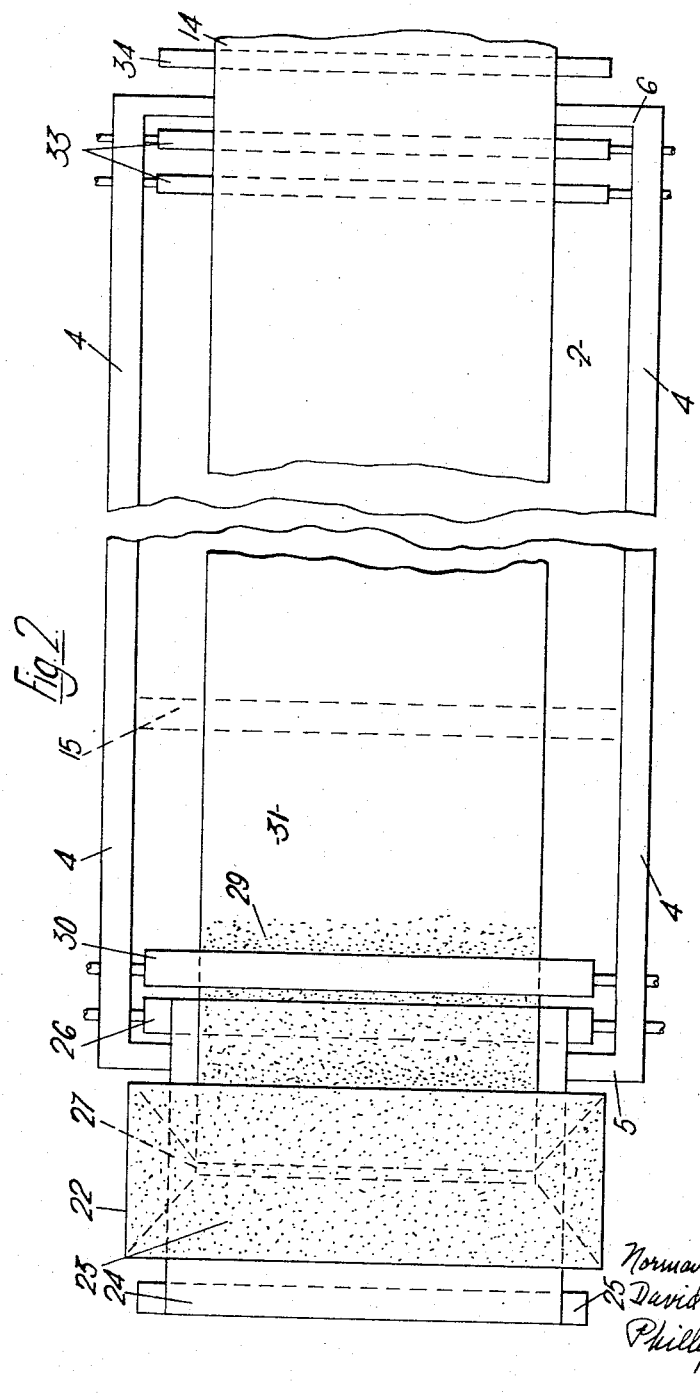

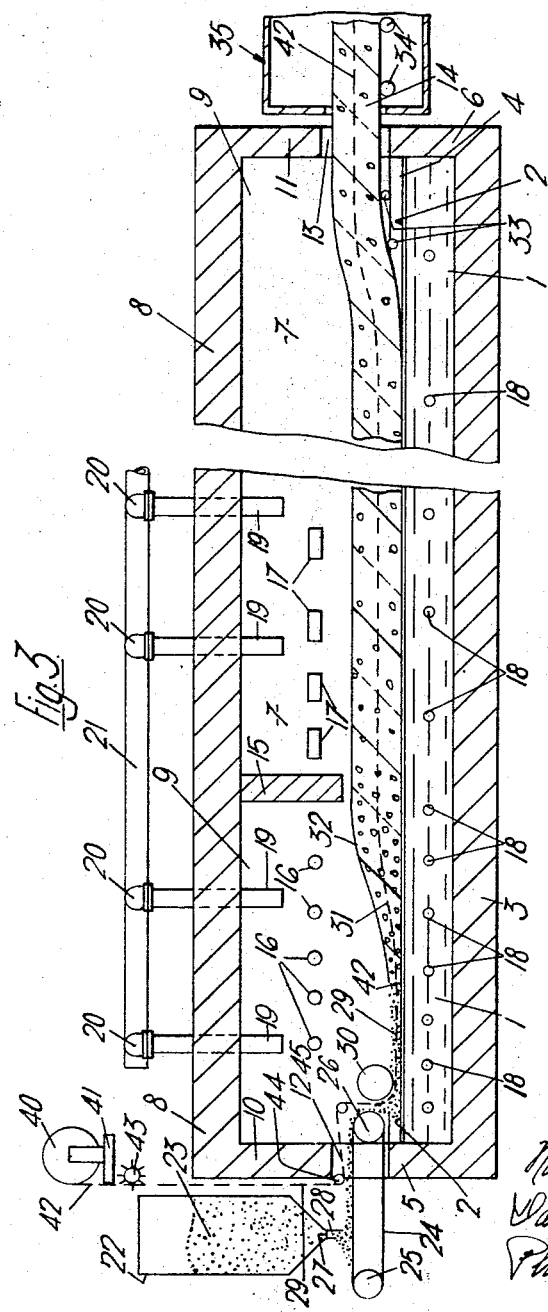

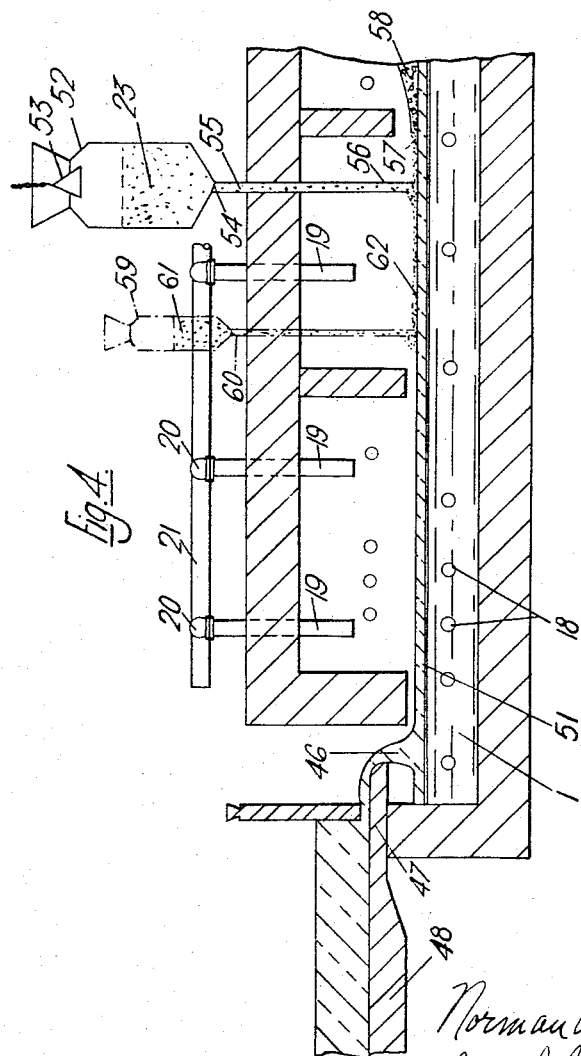

United States Patent Office 3,361,550
Patented Jan. 2, 1968

1

3,361,550
MANUFACTURE OF CELLULAR MATERIAL ON A MOLTEN METAL BATH
Norman Aidan Murphy, Liverpool, and David Gordon Lightfoot and Phillip Sidney Irlam, Southport, England, assignors to Pilkington Brothers Limited, Liverpool, England, a corporation of Great Britain
Filed Dec. 17, 1964, Ser. No. 419,009
Claims priority, application Great Britain, Dec. 18, 1963, 50,094/63
6 Claims. (Cl. 65—22)

ABSTRACT OF THE DISCLOSURE

Cellular glass is manufactured continuously by feeding powdered ingredients on to a bath of molten metal on which they are formed into an advancing layer, the layer being heated as it is advanced so that it coheres and foams to form a ribbon of cellular glass which is stabilised before removal from the bath.

---

This invention relates to the manufacture of cellular material and more especially to a method of and apparatus for the continuous manufacture of cellular glass in ribbon form.

It has been proposed to manufacture cellular material by mixing powdered material with a foaming agent and heating the mixture to produce a cellular product. For example cellular glass has been produced by mixing powdered glass with a foaming agent and then heating the mixture to produce a cellular glass. This method has usually been carried out by heating the powdered mixture in a mould so that the foam glass fills the mould. Slabs of cellular glass for use as an insulating or building material have been manufactured in this way.

It is a main object of the present invention to provide an improved method and apparatus for the continuous manufacture of cellular material.

According to the invention there is provided a method of manufacturing cellular material, comprising continuously advancing at a controlled rate over a substantially frictionless support for said material, a layer of a mixture of powdered ingredients of said material including a foaming agent, heating the layer as it is advanced sufficiently to cause the mixture to cohere and foam, and cooling the ribbon of cellular material so formed as it is advanced along the support to stabilise the cellular material.

Further the invention provides a method of manufacturing cellular glass, comprising continuously advancing at a controlled rate over a support which is not wettable by molten glass a layer of a mixture of powdered glass-forming material and a foaming agent, heating the layer as it is advanced sufficiently to cause the mixture to cohere and foam, and cooling the cellular glass so formed as it is advanced along the support to stabilise the cellular glass.

The support may be of any suitable material which is not wettable by molten glass, for example a carbon channel along which the layer of the powdered mixture is advanced as it is heated, or a gaseous film over which the ribbon of cellular glass is advanced. Preferably however the support is constituted by molten metal, for example molten tin or a tin alloy having a specific gravity greater than that of the layer of powder and of the cellular glass. The powdered glass-forming material may be, for example a clay material such as loess, which when heated to an appropriate temperature, for example about 1200° C., is transformed into a glassy material. Desirably according to the invention however powdered glass is used, for example crushed soda-lime-silica glass cullet.

Further according to the invention there is provided a method of manufacturing cellular glass, comprising continuously advancing at a controlled rate over molten metal a layer of a mixture of powdered glass and a foaming agent, heating the layer as it is advanced sufficiently to cause the mixture to cohere and foam, and cooling the cellular glass so formed to stabilise the glass as a ribbon of cellular glass of desired thickness.

Preferably according to the invention the molten metal support is a bath of molten metal, for example molten tin or a tin alloy, and may, for example be so constituted as to have all the characteristics fully described in our United States Paent No. 2,911,759.

Accordingly the invention also comprehends a method of manufacturing cellular glass on a bath of molten metal, comprising feeding an intimate mixture of powdered glass and a foaming agent at a controlled rate on to a bath of molten metal to form a layer of said mixture on the bath, advancing the layer along the bath, heating the layer as it is advanced sufficiently to cause the mixture to cohere and foam, and cooling the ribbon of glass so formed, as it is advanced, to stabilise the ribbon when it has attained a desired thickness.

In one method of operation according to the invention the powdered glass is crushed cullet, and the foaming agent consists of ferric oxide and carbon. The mixture may contain from 1% to 2.5% by weight of ferric oxide and from 0.2% to 0.5% by weight of anthracite the layer of the mixture being heated as it is advanced to a temperature of 840° C. in a period of about 30 minutes, and the cellular glass being stabilised by cooling to a temperature of about 600° C.

In another method of operation according to the invention the powdered glass is crushed cullet, and the foaming agent consists of sodium sulphate or calcium sulphate and carbon.

The mixture of powdered glass and foaming agent may contain 0.08% by weight of sodium sulphate and 0.01% by weight of anthracite, the layer of said mixture being heated as it is advanced to a temperature of 950° C. in a period of about 30 minutes, and the cellular glass being stabilised by cooling to a temperature of about 600° C.

In another mixture there may be 0.1% by weight of calcium sulphate and 0.5% by weight of anthracite.

Carbon may be used on its own if the powdered glass contains a sufficient quantity of a compound which will oxidise the carbon, for example a sulphate, arsenate, antimonate, sulphite, thiosulphate or peroxide. Alternatively the foaming agent may be a compound which itself gives off gas when heated, for example calcium carbonate.

Still further according to the invention there is provided a method of manufacturing cellular glass, comprising foaming glass as it is advanced continuously along a bath of molten metal to form cellular glass in ribbon form, and cooling the ribbon of cellular glass so formed sufficiently to stabilise the cellular glass.

The invention also comprehends a method of manufacturing cellular glass, comprising foaming glass and advancing the foamed glass continuously along a bath of molten metal to form cellular glass in ribbon form, and cooling the ribbon of cellular glass so formed sufficiently to stabilise the cellular glass.

In another method according to the invention the layer of a mixture of powdered glass-forming material and a foaming agent may be formed on a ribbon of glass which is being advanced along a bath of molten metal at a controlled rate, the layer being heated as it is advanced over the bath by the advancing ribbon of glass so that mixture coheres and foams, to form a layer of cellular glass backed by a ribbon of glass to which the cellular glass coheres. This composite ribbon of glass is then cooled as it is advanced to stabilise the ribbon.

A particulate inter-layer of a decorative material may be first deposited on the ribbon of glass before the layer of said mixture is deposited. The inter-layer may be of enamel frit having a low melting point, which frit melts to form a coloured enamel inter-layer during the heating of the glass-forming materials.

Alternatively, and in order to give the composite material a scintillating appearance the inter-layer may be of a decorative powdered material selected from the group consisting of powdered copper, a powdered mixture of copper and titanium, powdered aluminum, ground quartz and ground mica.

Further according to the invention there is provided apparatus for continuously manufacturing cellular glass, comprising an elongated support which is not wettable by molten glass and is arranged to support a layer of a mixture of powdered glass-forming material and a foaming agent, feeding means operable to feed said mixture at a controlled rate into the layer, means for advancing said layer along the support at a controlled rate, heating means associated with the support for heating the layer as it is advanced sufficiently to cause the mixture to cohere and foam, cooling means associated with the support and operable to cool the ribbon of cellular glass so formed when it has attained a desired thickness, and means for taking the cooled ribbon of cellular glass from the support.

Further according to the invention reinforcing wire may be fed into the layer of powdered materials so that it is ultimately incorporated in the cellular ribbon.

Preferably apparatus according to the invention comprises an elongated tank structure containing a bath of molten metal, means at one end of the tank structure for feeding at a controlled rate on to the bath a mixture of powdered glass and a foaming agent to establish a layer of said mixture on the bath, means for advancing said layer at a controlled rate along the bath towards the outlet end thereof, heating means associated with the bath for heating the layer as it is advanced sufficiently to cause the mixture to cohere and foam, cooling means associated with the bath and operable to cool the ribbon of cellular glass so formed when it has attained a desired thickness, and means at the outlet end of the bath for taking the cooled ribbon of glass from the bath.

The tank structure may be so wide at the surface level of the bath that the layer of powdered mixture fed to the bath and the ultimate ribbon of cellular glass produced cannot touch the side walls of the tank structure. It may be desirable however for the ribbon of cellular glass to be constrained by the side walls of the tank structure in order to mould or square-off the edges of the ribbon of cellular glass.

The hot cellular glass is in a sticky or plastic form and would wet on to the side walls of the tank structure if they are made of ordinary refractory material. In order to facilitate this method of operating according to the invention the side walls of the tank structure at least at the surface level of the bath may be formed of a material which is not wetted by molten glass. The non-wettable material is preferably carbon in the form of graphite.

In a preferred embodiment of the invention the feeding means comprises a hopper for said particulate mixture and a conveyor extending under the bottom of the hopper and through an inlet in said one end of the tank structure to deliver said mixture at a controlled rate on to the bath, and a roller is mounted between the side walls of the tank structure so that it extends across the bath just above the bath surface near the end of the conveyor to form and advance said layer of mixture along the bath.

A ribbon of flat glass backed by a layer of cellular glass may be manufactured by a method according to the invention, and apparatus for carrying out this method may comprise means at one end of the bath for feeding glass to the bath at a controlled rate and for advancing the glass in ribbon form along the bath, feeding means mounted in a roof structure bridging the tank structure and operable to deposit on the ribbon of glass a layer of a mixture of glass-forming material and a foaming agent, whereby said layer is advanced over the bath by the advancing ribbon of glass and there is formed a layer of cellular glass backed by a ribbon of glass to which the cellular glass coheres.

Second feeding means may be mounted in the roof structure upstream of said first mentioned feeding means and arranged to deposit a particulate inter-layer of a decorative material on the ribbon of glass before the layer of said mixture of glass-forming materials and foaming agent is deposited.

The invention also comprehends cellular glass produced by a method as described above, and a cellular glass article cut from cellular glass so produced.

In order that the invention may be more clearly understood some embodiments thereof will now be described, by way of example, with reference to the accompanying drawings in which:

FIGURE 1 is a sectional elevational of apparatus according to the invention for the continuous manufacture of cellular glass in a tank structure containing a bath of molten metal, FIGURE 2 is a plan view of the apparatus of FIGURE 1 showing the feeding arrangements for feeding a particulate mixture on to the bath of molten metal, FIGURE 3 is a sectional elevation similar to FIGURE 1, but additionally illustrating the incorporation of reinforcing wire mesh into the cellular glass, and FIGURE 4 is a view similar to FIGURE 3 illustrating the feeding of particulate material on to a ribbon of glass advancing along a bath of molten metal.

Referring to FIGURES 1 and 2 of the drawings, a continuous support which is not wettable by molten glass is constituted by an elongated bath 1 of molten tin or a tin alloy having a specific gravity greater than glass. The surface level of the bath is indicated at 2. The bath 1 of molten metal is contained in an elongated tank structure comprising a floor 3, side walls 4, an inlet end wall 5 and an outlet end wall 6. The floor 3, and walls 4, 5 and 6 together form the integral tank structure.

A roof structure is supported over the tank structure to define a headspace 7 over the bath. The roof structure consists of a roof 8, side walls 9, an end wall 10 at the inlet end of the bath and an end wall 11 at the outlet end of the bath.

The inlet end walls 5 and 10 define an inlet 12 to the bath through which a particulate mixture is delivered on to the bath surface as will be described below. Similarly the outlet end walls together define an outlet 13 through which the ultimate ribbon 14 of cellular glass produced is taken and delivered to an annealing lehr in well known manner.

The headspace 7 is divided by a partition 15 which extends downwardly from the roof and between the side walls 9. Upstream of the partition 15, heaters 16 are mounted in the headspace, and downstream of the partition 15 there are water cooled boxes 17 which serve to cool the cellular glass rapidly as it emerges from under the partition 15. Thermal regulators 18 are immersed in the bath 1 to regulate the temperature of the bath so that each region of the bath is at the same temperature as the headspace over that region.

The roof structure is provided with downwardly extending ducts 19 which are connected by headers 20 to a common supply duct 21 through which a protective atmosphere is supplied into the headspace. The protective atmosphere is maintained at a plenum in the headspace so that there is a flow of atmosphere outwardly through the inlet 12 and outlet 13 which serves to minimise the ingress of external atmosphere into the headspace 7.

Outside the inlet end wall 10 there is mounted a hopper 22 for a mixture 23 of powdered glass and foaming agent which is to be fed on to the bath. In one example the powdered glass is soda-lime-silica glass cullet which has been crushed and sieved to pass through a 150 B.S. mesh, and the foaming agent which is intimately mixed with the powdered glass may be for example 1.15% by weight of ferric oxide and 0.2% by weight of anthracite.

A conveyor 24 of heat-resisting material extends under the bottom of the hopper between rollers 25 and 26. The roller 26 is mounted inside the tank structure so that the conveyor extends through the inlet 12.

The bottom of the hopper is tapered down to a slot-shaped outlet 27, and one face 28 of the outlet acts as a doctor blade to ensure that an even layer 29 of the powdered mixture is formed on the conveyor 24. Inside the tank structure and extending between the side walls 4 there is a further guide roller 30 which guides the layer of mixture 29 on to the bath surface and advances the layer 29 along the bath surface at a controlled rate. Thus the intimate mixture 23 of powdered glass and a foaming agent is fed at a controlled rate on to the bath 1 of molten metal to form a layer 29 of the mixture on the bath, which layer is advanced along the surface 2 of the bath at a controlled rate.

As the layer is advanced it is heated by the heaters 16 in the headspace and by the bath itself whose temperature is controlled by the regulators 18. At the inlet end of the bath the temperature is about 650° C., and as the layer of powder is slowly advanced along the bath surface it is gradually heated to about 850° C. which is the temperature on the upstream side of the partition 15. In order to ensure that the heating of the powder layer is uniform, the rate of advance of the layer is such that this heating process from the inlet 12 to the partition 15 takes about 30 minutes, for example.

The powdered glass softens as it is heated and at the same time, since there is uniformity of temperature throughout the thickness of the layer, there is a uniform reaction of the foaming agent, which releases gas, in this example carbon dioxide, so that the powdered mixture coheres and foams at the same time. The mixture rises as shown at 31 in FIGURE 1, until by the time the cellular glass so formed is approaching the partition 15 it has risen to the desired thickness.

The cellular glass in ribbon form 32 is subjected to a cooling action as it emerges from under the partition 15 by the operation of the water boxes 17 above the glass and the thermal regulators 18 which are immersed in the bath and so control the extraction of heat from the underface of the foamed glass by the molten metal of the bath.

This cooling action causes the temperature of the cellular glass to fall, for example from 840° C. to about 750° C., at which latter temperature the ribbon of cellular glass is stabilised at the desired thickness.

After the ribbon 32 of cellular glass has been stabilised it is gradually cooled as it is advanced until by the time it reaches the outlet end of the bath the temperature of the glass is about 650° C. and the cellular glass ribbon 14 is sufficiently stiffened to be taken unharmed from the bath by mechanical means, namely take-up rollers 33 of carbon or stainless steel mounted in the tank structure near the outlet 13, and conveyor rollers 34 on which the ribbon is delivered into an annealing lehr of conventional design which is indicated generally by the reference 35.

The conveyor rollers 34 apply traction to the ribbon 32, which traction is controlled to be commensurate with the rate of feed of the powdered mixture on to the bath so that there is no break in the layer of powder advanced along the bath surface by the roller 30.

The resulting cellular glass has great strength, and, for example, may have a bulk density of the order of 10 lbs. per cubic foot, and is suitable for use as a thermal or acoustical insulating building material, or as a buoyant material. The cell size, and hence the bulk density, can be varied by selection of the ingredients of the powdered mixture. For example a structural material can be produced having a bulk density of 50 lbs. per cubic foot. The bulk density can also be varied by increasing the speed of draw and thus reducing the time during which the materials are at a temperature at which foam is formed. It has been found that the finer the particle size of the powdered glass, the carbon and the ferric oxide which together constitute the mixture, the more uniform will be the cell size of the resulting cellular glass.

Other powdered mixtures may be used, for example a mixture of powdered cullet with 2.5% by weight of rouge and 0.5% by weight of anthracite, the advancing layer being heated to about 840° C.

Alternatively the foaming agent may consist of sodium sulphate or calcium sulphate and carbon. For example a mixture of powdered cullet with 0.08% by weight of sodium sulphate and 0.01% by weight of anthracite, the layer being heated to about 950° C. in about 30 minutes and the cellular glass stabilised by cooling to a temperature of about 600° C.

As another example the mixture may contain 0.1% by weight of calcium sulphate and 0.5% by weight of anthracite the treatment being the same as just mentioned for sodium sulphate.

A mixture which consists of crushed cullet with 0.7% by weight of carbon may be used, the treatment of the mixture being the same as described above for a mixture containing sodium sulphate. Foaming agents which themselves generate gas when heated may be used, for example calcium carbonate or ammonium carbonate, these materials resulting in a white product. Coloured cellular glass may be obtained by the addition of colouring agents, for example chromic oxide, cobalt oxide, calcium sulphide or ceramic pigments.

Although it is convenient to use crushed cullet in the process of the invention, other glass-forming materials may be used such as clay, for example loess.

In the method described above with reference to the drawings the width of the tank structure is such that the risen cellular glass does not touch the side walls of the tank structure. If however the side walls of the tank structure are formed at the surface level of the bath by a material which is not wetted by molten glass, for example carbon, then the width of the slot outlet 27 from the hopper 22 may be such that the edges of the ribbon of cellular glass do touch the non-wetting side walls of the tank and are squared-off by this contact as they slide along the non-wetting side walls.

Referring to FIGURE 3, reinforcing wire mesh may be continuously incorporated in the cellular glass as it is produced. A reel of wire mesh 40 is supported in a stand 41 above the inlet end of the roof structure 8. Wire mesh 42 from the reel 40 is continuously fed by a spiked roller 43 downwardly towards the inlet 12. There is a water-cooled guide 44 outside the inlet and a second water-cooled guide 45 inside the inlet 12, and the wire mesh 42 passes around the guides and then through the pass between the rollers 26 and 3 where the mesh 42 is incorporated in the layer 29 of the powdered mixture of glass-forming materials and a foaming agent.

The wire mesh rises with the mixture as the layer foams so that ultimately the wire mesh lies centrally through the ribbon of cellular glass. Not only does the wire mesh reinforce the cellular glass but also it assists the advancing of the cellular glass along the bath of molten metal.

Foam-backed glass can be manufactured by a method according to the invention which is illustrated in FIGURE 4. Molten glass 46 is poured on the bath 1 of molten metal by a spout 47 which forms the termination of a forehearth 48. A tweel 49 controls the rate of delivery of the glass on to the bath and a layer of molten glass 51 is established on the bath. This layer is advanced in ribbon form and cooled as it is advanced until it is capable of supporting a layer of a powdered mixture of glass-forming materials and a foaming agent.

A feeding hopper 52 is mounted in the roof structure and the powdered mixture 23 is fed into the hopper through a gate 53. A shutter 54 controls the flow of mixture through a slot-shaped outlet 55 which extends downwardly through the roof structure into proximity with the top surface of the ribbon of glass 51. The lower part of one face 56 of the outlet acts as a doctor blade to ensure that an even layer 57 of the powdered mixture is formed on the top surface of the ribbon of glass 51. This layer 57 is advanced by the advancing ribbon of glass on which it is supported and is heated as it is advanced to a temperature of between about 800° C. and 950° C., depending on the composition of the mixture as described above. The layer 57 foams to form a layer of cellular glass 58 which at the foaming temperature becomes integrally bonded with the ribbon of glass 51.

The ribbon of foam-backed glass is then cooled by the coolers 17 to stabilise the foam and is discharged from the bath onto the conveyor rolls 34.

A second feeding means is illustrated in dotted lines in FIGURE 4 and comprises a hopper 59 mounted in the roof structure 8 upstream of the first hopper 52. The second hopper 59 also has a slot-shaped outlet 60 which ends in close proximity to the upper surface of the ribbon of glass. A powdered decorative material 61 is contained in the hopper 59, for example, a powdered low melting point enamel frit, powdered copper, a powdered mixture of copper and titanium, powdered aluminum, ground quartz or ground mica. The latter two materials give a scintillating appearance.

A fine interlayer 62 of the decorative material is deposited on the ribbon of glass 51 before the layer 57 is deposited, and forms a decorative inter-layer which is visible through the outer surface of the foam-backed ribbon, and gives the foam backed ribbon a pleasing appearance, which is particularly advantageous when the foam-backed glass is to be employed as a cladding material for external walls and roofs of buildings.

Thus the invention provides an improved continuous process for the manufacture of cellular glass, and, more especially when employing a bath of molten metal as the support along which the cellular glass or a ribbon of flat glass carrying a layer of cellular glass is advanced, much better temperature regulation is possible than has been possible hitherto because the contact of the powdered mixture with the highly thermally conductive molten metal bath either intimately or through the ribbon of flat glass permits rapid and uniform temperature exchange between the powdered mixture and the cellular glass, and the molten metal bath. This assists both the heating of the powder and the required cooling of the ribbon of cellular glass when it has risen to the desired thickness.

We claim:

1. A method of manufacturing cellular glass, comprising continuously feeding at a controlled rate on to a bath of molten metal a mixture of a powdered material which is a member of the group consisting of powdered vitreous materials and powdered glass forming materials, and a foaming agent, forming a layer of the powdered mixture on the bath, maintaining the layer at a substantially uniform thickness while continuously advancing that layer at a controlled rate along the bath, heating the layer as it is advanced sufficiently to cause the mixture to cohere and foam, and cooling the ribbon of cellular glass so formed as it is further advanced along the bath to stabilise the cellular glass.

2. Apparatus for continuously manufacturing cellular glass, comprising an elongated support which is not wettable by molten glass, feeding means operable to feed at a controlled rate on to the support a mixture of powdered ingredients of said cellular glass incluidng a foaming agent, means for forming a layer of powdered mixture on the support, a metering roller for maintaining said mixture at a substantially uniform thickness and for advancing said layer along the support at a controlled rate, heating means associated with the support for heating the layer as it is advanced sufficiently to cause the mixture to cohere and foam, cooling means associated with the support and operable to cool the ribbon of cellular glass so formed when it has attained a desired thickness, and means for taking the cooled ribbon of cellular glass from the support.

3. Apparatus for continuously manufacturing cellular glass, comprising an elongated tank structure containing a bath of molten metal, means at one end of the tank structure for feeding at a controlled rate on to the bath a mixture of powdered glass and a foaming agent, means for forming a layer of said mixture on the bath, a metering roller for maintaining said mixture at a substantially uniform thickness and for advancing said layer at a controlled rate along the bath towards the outlet end thereof, heating means associated with the bath for heating the layer at it is advanced sufficiently to cause the mixture to cohere and foam, cooling means associated with the bath and operable to cool the ribbon of cellular glass so formed when it has attained a desired thickness, and means at the outlet end of the bath for taking the cooled ribbon of glass from the bath.

4. Apparatus according to claim 3, wherein said feeding means comprises a hopper for the particulate mixture and a conveyor extending under the bottom of the hopper and through an inlet in said one end of the tank structure to deliver said mixture at a controlled rate on to the bath, and a roller is mounted between the side walls of the tank structure so that it extends across the bath just above the bath surface near the end of the conveyor to form and advance said layer of mixture along the bath.

5. Apparatus for continuously manufacturing cellular glass, comprising an elongated tank structure containing a bath of molten metal, means at one end of the tank structure for feeding at a controlled rate on to the bath a mixture of powdered glass and a foaming agent, means for forming a layer of said mixture on the bath and for advancing said layer at a controlled rate along the bath towards the outlet end thereof, heating means associated with the bath for heating the layer at it is advanced sufficiently to cause the mixture to cohere and foam, cooling means associated with the bath and operable to cool the ribbon of cellular glass so formed when it has attained a desired thickness, means at the outlet end of the bath for taking the cooled ribbon of glass from the bath, comprising means at one end of the bath for feeding glass to the bath at a controlled rate and for advancing the glass in ribbon form along the bath, feeding means mounted in a roof structure bridging the tank structure and extending downwardly to terminate just above the path of travel of the ribbon along the bath, and a doctor blade at the lower end of the feeding means to form the powdered mixture fed on to the ribbon of glass into a uniform layer.

6. Apparatus according to claim 5, including second feeding means mounted in the roof structure upstream of said first mentioned feeding means and arranged to deposit and form a particulate inter-layer of a decorative material on the ribbon of glass before the ribbon is advanced beneath said first mentioned feeding means.

References Cited

UNITED STATES PATENTS

| | | | |
|---|---|---|---|
| 398,995 | 5/1889 | Atterbury | 65—60 |
| 2,123,536 | 7/1938 | Long | 65—22 |
| 2,264,244 | 11/1941 | Lytle | 65—60 |
| 2,292,026 | 8/1942 | Gillett | 65—60 |
| 2,310,457 | 2/1943 | Owen | 65—22 |
| 2,381,945 | 8/1945 | Field | 65—22 |
| 3,056,184 | 10/1962 | Blaha | 65—144 |
| 3,288,584 | 11/1966 | Long | 65—99 |
| 3,300,289 | 1/1967 | Long | 65—99 |
| 3,305,333 | 2/1967 | Hynd | 65—149 |

HOWARD R. CAINE, *Acting Primary Examiner*.

DONALL H. SYLVESTER, *Examiner*.

G. R. MYERS, *Assistant Examiner*.